United States Patent [19]

Jerez

[11] Patent Number: 5,491,963
[45] Date of Patent: Feb. 20, 1996

[54] GARDEN CLEANING IMPLEMENT FOR CUTTING/MACERATING WEEDS ABOVE AND BELOW GROUND

[76] Inventor: Orlando Jerez, 3333 Delaware Ave., Kenner, La. 70065

[21] Appl. No.: 288,959

[22] Filed: Aug. 11, 1994

[51] Int. Cl.$^6$ .............................. A01D 34/68; A01B 1/06; A01B 39/08; A01B 39/18
[52] U.S. Cl. .............................. 56/17.1; 56/17.4; 56/17.5; 56/320.1; 172/14; 172/41; 172/111
[58] Field of Search .................................... 56/16.9, 17.4, 56/17.5, 17.1, 320.1, 295, DIG. 24; 30/122, DIG. 5; 172/14, 41, 111, 247, 522, 720

[56] References Cited

U.S. PATENT DOCUMENTS

| | | | |
|---|---|---|---|
| 1,610,161 | 12/1926 | Russell | 172/98 |
| 2,574,237 | 11/1951 | Barrow | 172/41 X |
| 2,886,716 | 6/1955 | Sellers | 56/17.4 |
| 2,968,903 | 1/1961 | Kesling | 56/17.5 X |
| 2,991,838 | 7/1961 | Lane | 172/111 X |
| 3,129,771 | 4/1964 | Lidstone | 172/25 |
| 3,807,151 | 4/1974 | Rosenthal et al. | 56/16.9 |
| 4,293,041 | 10/1981 | Holmstadt et al. | 172/39 |
| 4,501,332 | 2/1985 | Straayer | 172/41 |
| 4,832,131 | 5/1989 | Powell et al. | 172/41 X |
| 4,862,682 | 9/1989 | Wait et al. | 56/255 |
| 4,911,247 | 3/1990 | Kuhlmann et al. | 56/17.5 X |

Primary Examiner—Stephen J. Novosad
Attorney, Agent, or Firm—C. Emmett Pugh; Pugh/Associates

[57] ABSTRACT

A garden cleaning implement (10) for weeds and the like comprising a cutting mechanism (14) and a retractable guard mechanism (28), generally free to "float" up and down about the cutter mechanism, carried on, for example, an extended pole handle (22). The cutting mechanism includes—an associated rotational power source (16/116); an intermediate, rotatable shaft (18) connected thereto; and a rotatable, rectangular blade, cutting member (20). The guard mechanism includes—a cylindrically-shaped, retractable housing (28) providing an enclosing cavity of a size sufficient to receive therein and protectively cover over the rotating cutting member; and a guide means (32) for guiding the retraction of the retractable housing along a path substantially parallel to the rotatable shaft's longitudinal axis between first, lower and second, upper positions, in which the rotatable cutting member is disposed within the enclosing cavity, and in which the rotatable cutting member is below and outside of the enclosing cavity, respectively. When the cutter mechanism is above ground level, the guard mechanism is in its down, cutter covering position under the force of gravity or biasing springs (68), protecting the user and any surrounding desirable vegetation (V) from the cutter; but, when the cutter mechanism is lowered down into the ground to macerate the weed roots and till the ground (G) around the roots, the guard mechanism is raised up by the ground contact of its lower periphery on the ground, allowing the cutter mechanism to easily go down into the soil outside of the protective enclosure as the guard moves up.

22 Claims, 5 Drawing Sheets

GARDEN CLEANING IMPLEMENT FOR CUTTING/MACERATING WEEDS ABOVE AND BELOW GROUND

TECHNICAL FIELD

The present invention relates to a powered, preferably hand-held, garden cleaning implement which is used to remove weeds and the like out of a garden, not only by cutting it above the ground but also by macerating or tilling their roots down in the ground, and more particularly to such a garden cleaning implement which has a cultivating/cutting member selectably disposable within a retractable, protective guard or housing, allowing for protective cutting above ground but ease of movement of the cutting member into the ground without interference with the protective guard or housing. The invention can be provided as a complete unit or as an add-on accessory for a "weed-eater" type device or other powered implement.

BACKGROUND ART

In the ongoing battle between the gardener and undesirable vegetation within a garden or lawn, there exists a multitude of devices and methods for extricating, chopping, removing and otherwise doing away with undesirable vegetation. These devices and methods include the use of: chemicals, such as herbicides; hand held implements, such as garden trowels; powered implements, such as string or monofilament line edgers and cutters, such as, for example, "weed-eater" type devices; and, of course, the old standby method of "on-the-knees" weeding using the hands for implements. However, none of these devices and methods has allowed the gardener to quickly and easily win the war against undesirable vegetation within the lawn or garden arena.

Although generally safe for use in close proximity to surrounding desirable vegetation, some of these devices and methods, such as hand troweling and weeding by hand, are slow, tedious and laborious. Other devices and methods, such as string edgers and herbicides, although more rapid and less labor intensive than hand troweling and weeding by hand, pose a serious danger to surrounding desirable vegetation when used. It would be a benefit, therefore, to have a device that would rapidly remove and/or destroy undesirable vegetation without being labor intensive and which at the same time was safe for use around desirable vegetation within a lawn or garden setting.

There have been various attempts to provide devices and methods which achieve rapid and safe, rapid removal or destruction of undesirable vegetation in close proximity to desirable vegetation within a lawn or garden. A list of prior patents which may be of interest is provided below:

| U.S. Pat. No. | Inventor | Issue Date |
| --- | --- | --- |
| 1,610,161 | Russell | 12/07/26 |
| 2,968,903 | Kesling | 01/24/61 |
| 3,129,771 | Lidstone | 04/21/64 |
| 3,807,151 | Rosenthal et al | 04/30/74 |
| 4,293,041 | Holmstadt et al | 10/06/81 |
| 4,501,332 | Straayer | 02/26/85 |
| 4,862,682 | Wait | 09/05/89 |

U.S. Pat. No. 1,610,161, to Russell, issued on Dec. 7, 1926, discloses a rotary hoe or chopper having a cutting tilling member rotating in a plane substantially parallel to the ground surface.

U.S. Pat. No. 2,968,903, to Kesling, issued on Jan. 24, 1961, discloses a lawn edge trimmer having a guard and grass lifter unit. The guard and grass lifter unit includes a U-shaped bracket supporting a star shaped unit. The star shaped unit is positioned below a cutting blade. As the trimmer is moved along the edge of a walk, the star shaped unit engages and lifts the grass which is then cut by the cutting blade.

U.S. Pat. No. 3,129,771, to Lidstone, issued on Apr. 21, 1964, discloses a cultivating tool having a metal rod having one end portion sharpened to a point and having affixed adjacent to the end point a plurality of teeth or tines. As the metal rod rotates, the sharpened end portion penetrates into the soil while the teeth or tines cut and macerate the surrounding soil.

U.S. Pat. No. 3,807,151, to Rosenthal et al, issued on Apr. 30, 1974, discloses a trimmer-edger including a housing supported for movement on wheels. The housing encloses the motor and defines a cutting chamber in which a rotary blade is disposed. A guard plate which swings away about an axis parallel to the axis of rotation of the rotary blade is included to facilitate access to the blade for maintenance and for cleaning out the cutting chamber.

U.S. Pat. No. 4,293,041, to Holmstadt et al, issued on Oct. 6, 1981, discloses a hand-held power driven cultivator that includes a pair of ground working implements or tillers. The tillers are counter-rotated and include interdigitating tines which engage and move the earth forwardly.

U.S. Pat. No. 4,501,332, to Straayer, issued on Feb. 2, 1985, discloses a hand-carried, portable weeder/cultivator apparatus for weeding and cultivating small areas. The apparatus includes an inverted dish-shaped element rigidly attachable to a conventional string-type edger for converting conventional above ground string-type weeders into a below ground weeder/cultivator.

U.S. Pat. No. 4,862,682, to Wait, issued on Sep. 5, 1989, discloses a blade assembly including a U-shaped blade used for tilling the soil.

A review of these prior patents show that they do not suggest or teach the innovating, utilitarian, valuable advances of the present invention.

For example, none of the aforementioned devices has provided a means for rapidly, and safely removing and/or destroying unwanted vegetation in close proximity to desirable vegetation that poses little or no danger to the desired vegetation or to the user or provided such a device in which a protective guard is free floating or resiliently biased so that it falls or moves down under the force of gravity or the biasing force into a protective mode when the device is in use to cut above the ground, but readily retracts due to ground contact when the cutter mechanism is lowered down into the ground to macerate the weed roots and till the surrounding soil.

GENERAL SUMMARY DISCUSSION OF INVENTION

It is thus an object of the invention to provide a garden cleaning implement which may be effectively used to destroy and/or remove undesirable vegetation in close proximity to desirable vegetation.

It is a further object of the invention to provide a garden cleaning implement which may be used to destroy and/or remove undesirable vegetation by chopping or cutting the undesirable vegetation both above and below the soil surface.

It is a still further an object of the invention to provide a garden cleaning implement which may be used to destroy and/or remove undesirable vegetation which has a rotating cutting/tilling member enclosed in a vertically moveable, retractable housing, particularly one which is "free floating" or resiliently biased, allowing the protective housing to move down under the force of gravity or resilient bias when the cutting mechanism is cutting above the ground and allowing it to "freely" move up when the cutting mechanism goes down into the ground, thus not hindering or substantially retarding the cutting mechanism's movement down into the ground a reasonable distance, yet providing protection to the surrounding vegetation and the user when operating above ground.

Accordingly, a garden cleaning implement is provided that comprises a cutting mechanism and a guard mechanism. The cutting mechanism includes— an associated powered source of rotational power; an intermediate, rotatable shaft, in rotational force receiving connection with the source of the rotational power; and at least one rotatable cutting member, in functionally rigid attachment to the rotatable shaft, having at least one functional cutting point or edge rotatable within a plane.

As used herein the term "rotational force receiving connection" means any mechanical connection that will allow the source of rotational power to supply a rotational force to the rotatable shaft including direct connections and connections through gearing mechanisms and flexible shafts, etc. The term "functionally rigid attachment" means any attachment that will allow the rotatable shaft to impart rotational energy to the cutting member including rigid and clutch type connections, as well as flexible connectors which are not constrained to follow a straight line, etc. The term "functional point" means a point located on a portion of the cutting member that will contact and severe vegetable material when the cutting member is rotating. In addition, it should be noted that the rotatable cutting member need not be planar itself and may be of any appropriate shape or configuration. Also, the cutting member may rotate about any point including its center or end, although the rectangular, two edge blade with a center axis disclosed below is preferred.

The guard mechanism includes—a retractable housing having a cavity of a size sufficient to receive therein the rotatable cutting member when the rotatable cutting member is rotating; and a guide means, in operational connection between the retractable housing and the cutting mechanism, for guiding the retraction of the retractable housing along a path substantially parallel to the axis of rotation of the rotatable shaft, between a first, lower, protective position surrounding the rotating cutter member and a second, upper position which allows the rotating cutting member to easily penetrate into the soil without significant hinderance from the guard. Thus, in the first position the rotatable cutting member is protectively disposed within the cavity defined by the guard and is effectively enclosed by the guard, protecting the user and any surrounding desirable vegetation or adjacent structures from the rotating cutter member; while the second position is one in which the rotatable cutting member is not disposed within, that is, is below and outside of, the cavity and can be easily allowed to go down in to the ground. The latter allows the rotating cutting member to go down into the ground to macerate the roots of the weeds and till the soil adjacent thereto without being hindered by the guard, which then preferably "freely" floats above the ground.

As used herein the term "operational connection" means any mechanical connection that will allow the retractable housing to move with relation to the cutting mechanism when in use, including direct mechanical connection between the retractable housing and the cutting mechanism and mechanical connections that include pans intermediate to the retractable housing and the cutting mechanism.

The guard mechanism may further include a top cavity plate having a means for connecting the cavity plate to the cutting mechanism and a surface having an aperture therethrough of a size sufficient to allow passage of the rotatable shaft for connection to the powered source. The top cavity plate is connected to the cutting mechanism in a manner such that a portion of the rotatable shaft between the source of rotational power and the rotatable cutting member is installed through the aperture, and the top cavity plate forms a barrier between the rotatable cutting member and the source of rotational power.

It is also possible to construct the guard mechanism such that the effective volume of the cavity decreases as the retractable housing moves toward the second position. This may be accomplished, for example, by constructing the cavity so that: (1) a portion of the cavity, defined by a side surface and a first and second open end, is cylindrically shaped; (2) constructing the top cavity plate to include a circular shaped portion having a diameter less than the diameter of the first and second open ends; and (3) installing the circular shaped portion of the top cavity plate within the cylindrical shaped portion of the cavity in a manner such that the circular shaped portion of the top cavity plate is slidable within the cylindrically shaped portion of the cavity.

The guide means may include, for example, at least one pin member having one end slidably entrapped within an appropriate aperture or opening and the other end rigidly attached either to the cutting mechanism or the retractable housing, or to some part in rigid connection with either the cutting mechanism or the retractable housing. The term "slidably entrapped" is used herein to mean any mechanical relationship wherein the range of movement of the end of the pin is at least partially defined by the sidewalls of the aperture or opening.

An example of such a guide means would be at least two, opposed, elongated, slotted apertures or openings through or within the side surface and a like number of guide pins having two end portions, with three, triangulated slots being preferred, each spaced about the periphery of a cylindrical housing by one hundred and twenty (120°) degrees. One end portion of each guide pin would be rigidly connected to the cutting mechanism and the other end portion of each guide pin would be slidably entrapped within one of the elongated apertures or openings.

The elongated apertures or cavities would be oriented in a direction substantially perpendicular to the plane of rotation of the rotatable cutting member, that is, substantially parallel to the axis of rotation, to define a path of movement for the retractable housing in a direction perpendicular to the plane of rotation of the cutting member. The length of the elongated apertures or cavities would be selected to provide a first position in which the cutting member was disposed within the enclosing cavity, and a second position in which the cutting member is not disposed within, that is, is below and outside of, the cavity.

The retractable housing may be constructed of a material having a weight sufficient to reliably move the retractable housing between the second and first positions under the force of gravity. However, if so desired, the guard mechanism may include biasing means, such as, for example, springs, for supplying a biasing force to the retractable housing in a direction to urge the retractable housing toward the first position, so that some positive, but reasonable amount of, force in addition to gravity is needed to move the housing up above the cutting member.

In addition, a locking mechanism, engageable by an operator, may also be included to allow for selectably securing the retractable housing in a desired, fixed position between and including either of the first and second positions.

With respect to the word "garden" it should be understood that this is not restricted to home or residential type applications, although that is a particularly efficacious application, but also includes industrial, agricultural, horticultural or farming, as well as commercial uses.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 5 is a perspective view of the preferred, exemplary embodiment of the garden cleaning implement of FIGS. 1–4, as connected to the shaft (partially shown) of a "weed-eater" type device and showing the retractable housing in the un-retracted, i.e., protective, blade covering position; while FIG. 5A is a perspective view of the preferred embodiment of the garden cleaning implement of FIGS. 1–4, showing the retractable housing in a retracted position, with the cutting blade at the bottom exposed and with the addition of an alternate, biasing or spring mechanism added but overcome by, for example, the housing being forced up by contact with the ground (not shown) as the user (also not shown) pushes the cutting member or blade down into the ground by pushing down on the handle of the implement.

FIG. 6A–C are top-perspective, side and top views, respectively, of an alternative, exemplary embodiment of the implement of the present invention showing a first, exemplary, clamping means for connecting the implement to the handle shaft of a "weed-eater" type of device; while FIG. 7A–C are top-perspective, side and top views, respectively, of another, alternative, exemplary embodiment of the implement of the present invention showing a second, exemplary, clamping means for connecting the implement to the handle shaft of a "weed-eater" type of device.

FIG. 8A is a side, perspective view of the embodiment of FIG. 6A–C attached to the end of a "weed-eater" type of device ready for use; while FIGS. 8B & C are partial, side, perspective views of the embodiments of FIG. 6A–C and FIG. 7A–C, respectively, attached to the end of a "weed-eater" eater type of device, with the combination in use cutting weeds while protecting adjacent, desirable vegetation.

It is noted that the illustrations of FIGS. 6A–8C are simplified, generalized views that do not include all of the details of these embodiments, which details however should be nonetheless clear and understood from the more detailed views of FIGS. 1–5A, with the details between the embodiments of these two sets of figures being identical or at least comparable.

FIGS. 9(A–C) through 12(A–C) are bottom, side and perspective views, respectively, of four, different, exemplary configurations for the cutting mechanism of the invention, namely, triangular [three (3) blades], cylindrical [one (1) blade], rectangular [four (4) blades], and oval [two (2) blades], respectively, with the cylindrical one of FIGS. 10A–C being exemplary of the embodiments of FIGS. 1–8.

EXEMPLARY MODES FOR CARRYING OUT THE INVENTION

Figure 1:
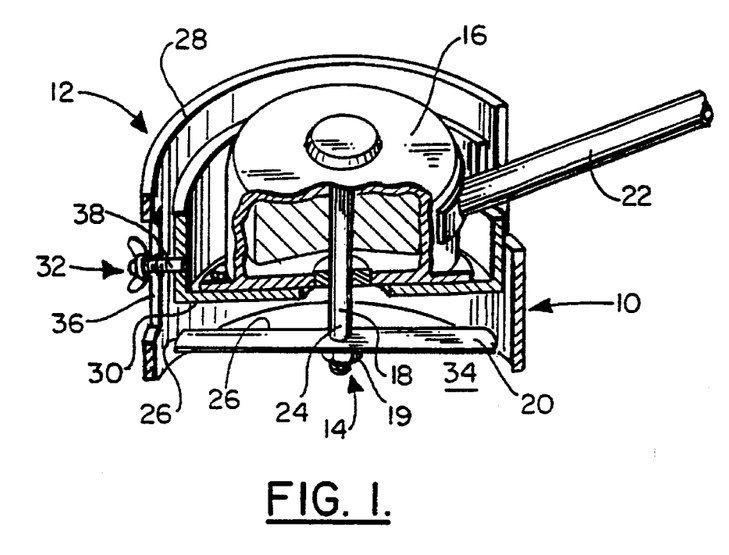
FIG. 1 is a cross-sectional view of a preferred, first, exemplary embodiment of the garden cleaning implement of the present invention showing its internal structure, including its internal motor.

As can be seen in the cross-sectional view of FIG. 1, as well as in FIGS. 2–5, a first, preferred, internally motorized embodiment of the garden cleaning implement 10 of the present invention comprises a guard mechanism, generally indicated by the numeral 12, and a cutting mechanism, generally indicated by the numeral 14.

The cutting mechanism 14 includes an electric motor 16 having a rotatable shaft 18, a rigid cutting member 20 attached to the rotatable shaft 18, and a handle member 22 in rigid connection with the electric motor 16. In this preferred embodiment, the cutting member 20 has the general, preferred shape of an elongated rectangle with the axis of rotation at its center 24 and with cutting, leading edges along its side edges 26. The cutting member 20 is similar in form to the blade of a circular mower but, of course, is much smaller in size.

It is preferred that cutting member 20 have a length of between about five and fifteen (5–15 cm) centimeters, and it is more preferred that the length be between about eight and twelve (8–12 cm) centimeters. The length of the cutting member 20 in this preferred embodiment is about eight and one-half (8.5 cm) centimeters.

The cutting member 20 is rigidly attached to the rotatable shaft 18 by a locking nut 19. However any device or method which forms an appropriate, functionally rigid attachment between cutting member 20 and rotatable shaft 18 may be used.

In this preferred embodiment, the motor 16 is an electric motor. However, any appropriate motor capable of supplying rotational power to a rotatable shaft may be used to practice the invention. In addition, although the rotatable shaft 18 in this preferred embodiment is the shaft of the motor 16, a gearing mechanism or other coupling device may be connected between the motor 16 and the rotatable shaft 18, if so desired.

The guard mechanism 12 includes a retractable housing 28, a top cavity plate 30, and a guide mechanism, generally indicated by the numeral 32. The retractable housing 28 and the top cavity plate 30 form a cavity or enclosure area 34 of a size sufficient to receive therein and protectively cover over the cutting member 20.

Also shown in FIG. 1 is one of the three, triangulated, elongated apertures 36 and one of the three guide pins 38 that partially make up the guide mechanism 32. The three elongated apertures 36 and the three guide pins 38 are more clearly shown in the exploded view of the guard mechanism 12 shown in FIG. 2. The retractable housing 28 may be constructed, for example, from a length of metal tubing and includes, for example, three (3) elongated, slotted apertures 36, a notched handle passageway 40, and an internal surface 41 that defines a cylindrical cavity portion 42 having a first open end 44 and a second open end 46.

Figure 2:
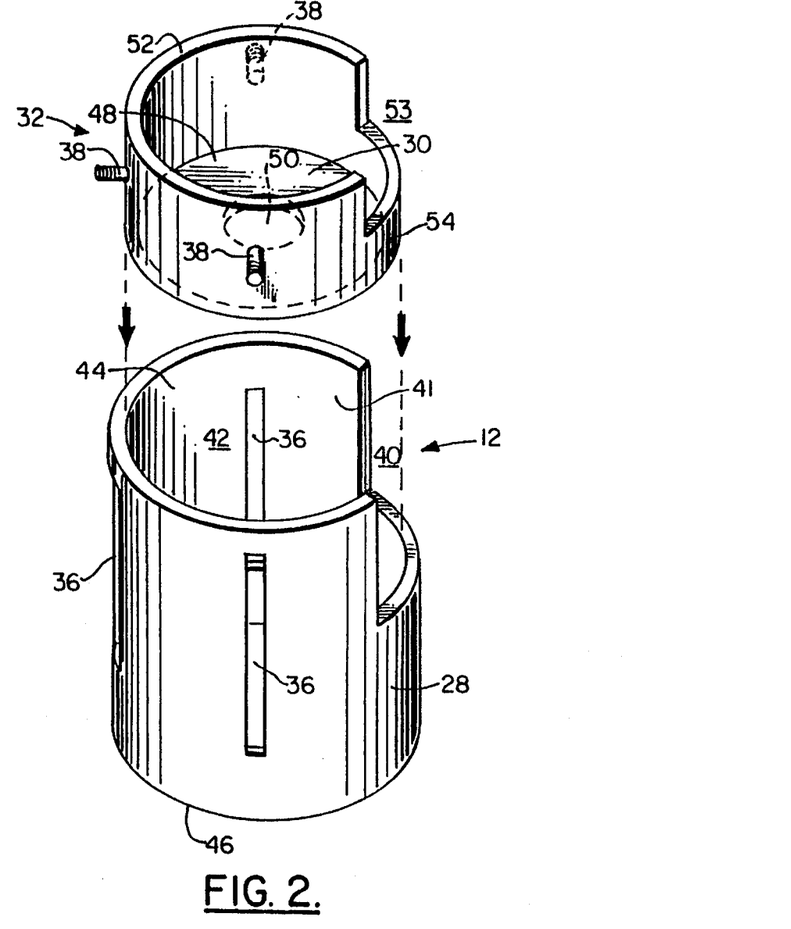
FIG. 2 is an exploded view of the preferred, exemplary guard mechanism of the implement of FIG. 1.

The top cavity plate 30 is constructed of a circularly-shaped piece of metal having a diameter slightly smaller than the diameter of the cylindrical cavity portion 42 in order to permit the top cavity plate 30 to slide within the cylindrical cavity portion 42 when assembled. The top cavity plate 30 includes a surface 48 having an aperture 50 of sufficient size to allow the rotatable shaft 18 to freely rotate when installed therethrough during assembly.

The guide mechanism 32 thus includes three elongated apertures 36, three, associated guide pins 38 and a connecting support 52. In this currently preferred, exemplary embodiment the connecting support 52 is a section of metal tubing attached along the perimeter edge 54 of the top cavity plate 30 having a notch 53 that is aligned with the handle notch 40 of the retractable housing 28 when assembled. The connecting support 52 provides a rigid connection between the guide pins 38 of the guide mechanism 32 and the cutting mechanism 14 through the top cavity plate 30.

In addition to providing a rigid support for the guide pins 38, the tubular shape of the connecting support 52 keeps the guide pins 38 substantially within the same plane by preventing the top cavity plate 30 from rotating within the cylindrical cavity portion 42. It should be noted herein that the apertures 36 could be located through connecting support 52 and the guide pins 38 rigidly connected to the retractable housing 28, without altering the sliding relationship between the retractable housing 28 and the top cavity plate 30. The use of the top cavity plate 30 in conjunction with the retractable housing 28 provides a cavity 34 (shown in FIG. 1) having a volume that decreases as the retractable housing 28 retracts to the second position and thereby acts to prevent or minimize the undesirable accumulation of dirt and clippings within the cavity 34 during use.

Figure 3:
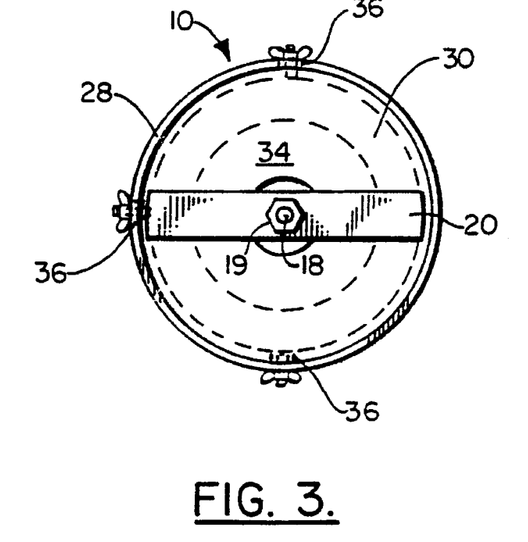
FIG. 3 is an underside view of a preferred embodiment of the garden cleaning implement of FIG. 1.

FIG. 3 is an underside view of the garden cleaning implement 10 showing the cavity 34, the retractable housing 28, the top cavity plate 30, the guide pins 38, the rotatable shaft 18, and the locking nut 19.

Figure 4:
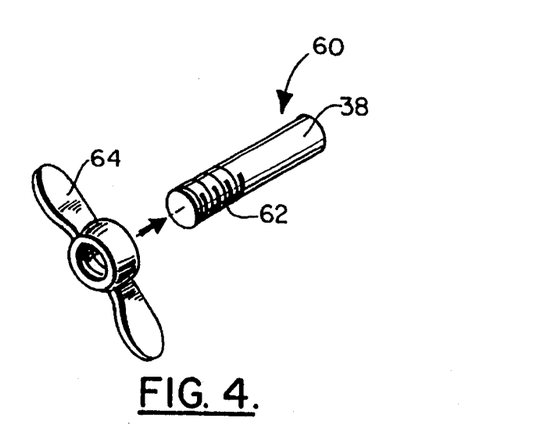
FIG. 4 is a detail perspective view showing a preferred, "wing nut" locking mechanism for selectively locking the retractable housing of the guard mechanism in any desired fixed position.

FIG. 4 illustrates a preferred, exemplary locking mechanism 60 for locking the retractable housing 28 in a fixed position. The locking mechanism 60 includes the addition of a threaded end portion 62 on each of the three guide pins 38 and three companionately threaded wing nuts 64. The retractable housing 28 may be locked in a desired position by tightening the wing nuts 64.

In use, the retractable housing 28 with the cutting member 20 rotating is placed down over the undesired weedy vegetation to be destroyed and/or removed. As the cutting member 20 is allowed to go lower (or forced down) into the ground, the entire undesired weedy vegetation, including its root structure, is cut, macerated and killed, while the housing isolates and protects any surrounding vegetation or adjacent structures from being cut or struck, while at least in part also protecting the user from flying debris.

Figures 5, 5A:
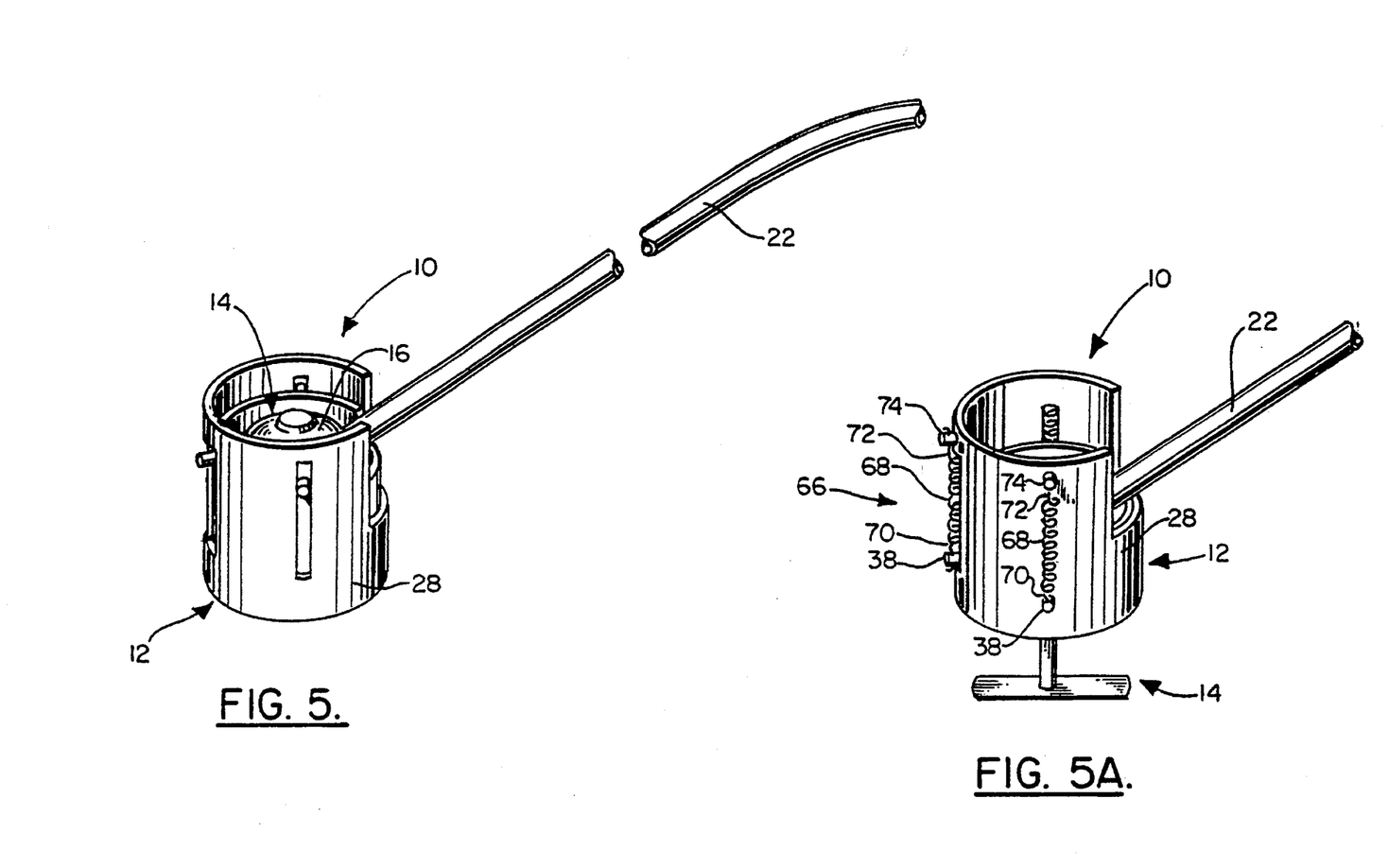

FIGS. 5 and 5A are perspective views of the preferred, exemplary embodiment of the garden cleaning implement 10 again illustrating the retractable housing 28 in the unretracted (FIG. 5) and retracted (FIG. 5A) positions, respectively.

Also shown in FIG. 5A is an exemplary, alternative biasing mechanism, generally indicated by the numeral 66.

The alternative, supplemental, biasing mechanism 66 includes three springs 68 (two shown) attached at one end 70 to the guide pins 38 and at the other end 72 to spring pins 74, which are rigidly or fixedly attached to the retractable housing 28. The springs 68 are extended when the retractable housing is in the second or retracted position and supply a biasing force to the retractable housing 28 that, when unopposed, urges the retractable housing 28 into the first or un-retracted position. The spring constants of the springs 68 are selected to allow the ground to supply a force to the retractable housing 28 that is sufficient to force the retractable housing 28 into the second or retracted position when the garden cleaning implement 10 is in use and the user bears down on the handle of the device.

As the cutting member 20 is lowered into the ground, the retractable housing 28 is forced upward from around the cutting member 20 by the surrounding soil, allowing the cutting member 20 to more easily penetrate into the ground. This allows not only an above-ground, protective cutting action, but also an in-ground tilling action, which macerates the roots of the undesired vegetation and the immediately surrounding ground.

When the cutting member 20 is removed up from the ground, the retractable housing 28 moves down under the biasing force of the springs (or the force of gravity, if "free floating") and shields or isolates the rotating cutting member 20, protecting the near-by desirable vegetation or adjacent structures, as well as the user, from possible injury from the rotating cutting member 20 and any debris it may cause to fly out from the force of being hit by the blade.

As noted above, the embodiment of FIGS. 1–5 includes an internal motor 16 to power the blade 20. As a further alternative, "accessory" approach of the invention, the embodiments of FIGS. 6A+ and FIGS. 7A+ show exemplary means 80 & 90, respectively, to attach the cutting mechanism (not seen but equivalent to the blade 20) and its retractable housing 128 to, for example, a "weed-eater" type device that includes its own motive power 116 (usually electrical or gas powered), typically located at or near the user or proximal end 122A of a handle 122. In this approach of the invention, the standard "weed-eater" or cutting line implement is disconnected from the bottom of the distal end 122B of the handle 122 and the garden cleaning implement (110/210) of the invention is attached in its place as, for example, an "add-on" accessory.

Figure 6A:
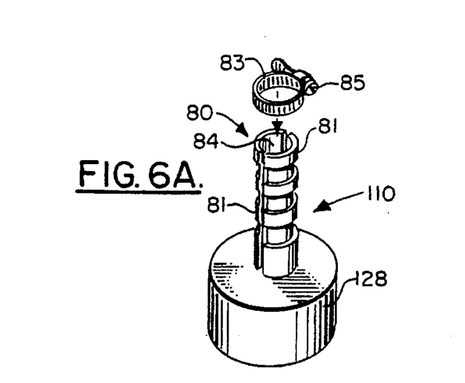
Figures 6B, 6C:
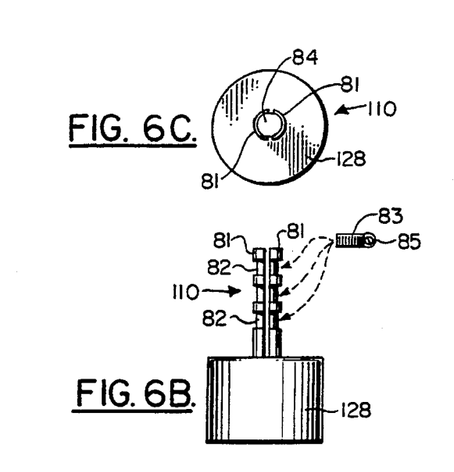

In the embodiment of FIGS. 6A–C the cutting/macerating implement 110 (with its retractable housing 128) is attached to the distal handle end 122B by means of a clamping mechanism 80 comprised of two, opposed, split, encircling members 81 having a series of indentations 82 formed in them, which can be tightly held together under compression by standard type clamps 83 placed in the indentations.

To attach the implement 110 to the "weed-eater" type device, the two split halves 81 with the clamps 83 loosened, that is, at their larger diameters, and loosely fitted around the split halves (or completely open and separate), are placed about the distal handle end 122B with the end positioned in the open interior 84 of the clamping mechanism 80. The screws 85 are then tightened, causing the effective diameters of the clamps 83 to be reduced, until the clamps tightly hold the two split halves 81 about the distal handle end 122B, firmly attaching the two together. In conjunction with this process the rotatable shaft (not shown but comparable to the shaft 18) is also fixedly connected to the internal, driven shaft of the "weed-eater" device in an appropriate manner, with many ways known to those of ordinary skill in the art.

Figures 7A, 7B, 7C, 8A, 8B, 8C:
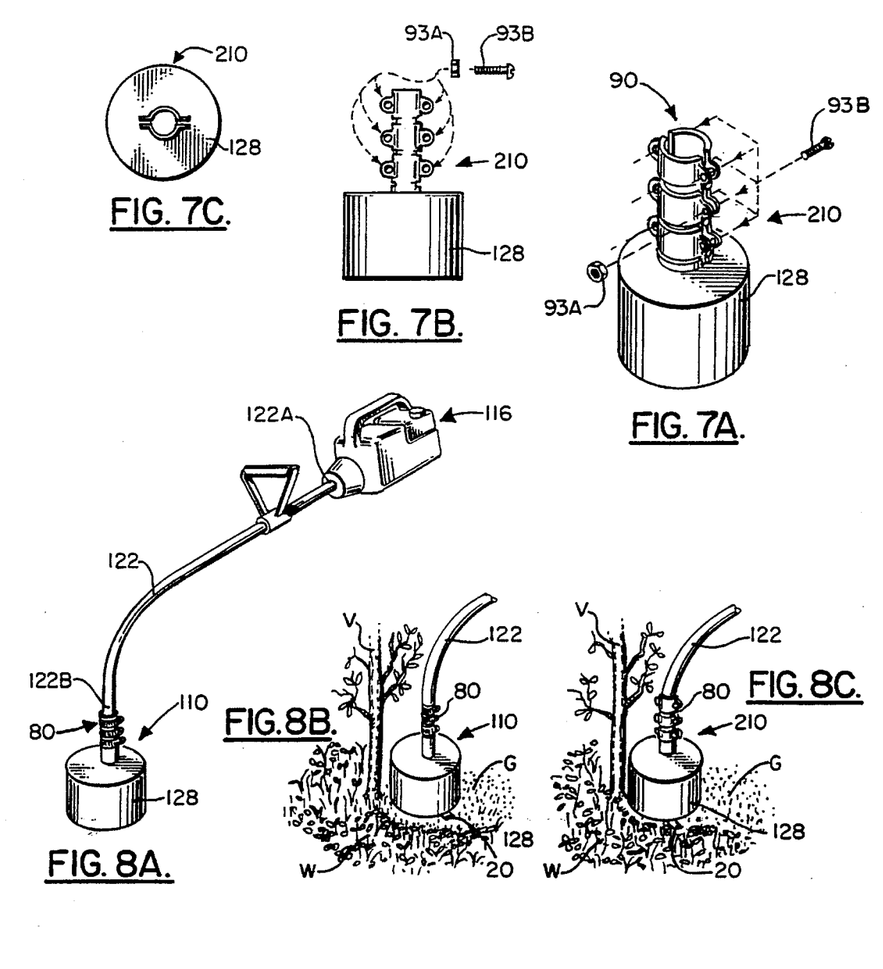

In the embodiment of FIGS. 7A–C the cutting/macerating implement 210 (with its retractable housing 128) is attached to the distal handle end 122B by means of a clamping mechanism 90 comprised of two, opposed, split, encircling, interfacing members 91 having a series of opposed bolt holes 92 formed in them along their vertically extended sides, which members can be tightly held together under compression by standard type nuts 93A threadingly engaged with bolts 93B placed in the bolt holes.

To attach the implement 210 to the "weed-eater" type device, the two split halves 91 with the nuts and bolts 93A/B loosened, that is, at their longer lengths, and loosely fitted to the split halves (or completely detached and separate), are placed about the distal handle end 122B with the end positioned in the open interior 94 of the clamping mechanism 90. The nuts and bolts 93A/B are then tightened, causing the two, split halves to be brought together until the two split halves 91 tightly hold the distal handle end 122B between them, firmly attaching the two together. In conjunction with this process the rotatable shaft (not shown but comparable to the shaft 18) is also fixedly connected to the internal, driven shaft of the "weed-eater" device in an appropriate manner, with many ways known to those of ordinary skill in the art.

As can be seen in FIGS. 8A–C, the "weed-eater" type device with the garden cleaning implement 110/210 attached to the distal, operative end of the pole handle 122B is used to clean out and macerate the weedy vegetation W, while the retractable housing 128 protects the adjacent or surrounding, desirable vegetation V (e.g., a decorative bush or flowering plant), in a manner substantially identical to that for the embodiments of FIGS. 1–5A discussed above.

The hand carryable and manipulable garden cleaning implement 10 (110/210) is typically used in the following manner:

a) the cutting mechanism 10 is manually moved around above the ground in a side-ways and up-and-down fashion, cutting the weeds "W" above the ground "G" as the weeds enter into the housing 28 (128) disposed in its first position, while using the housing to protect any desirable, adjacent vegetation "V" outside of the housing;

b) when so desired, the cutting member 20 is manually pushed down into the ground while the housing 28 is inherently moved up to the second position above the cutting member along the path parallel to the axis of rotation of the rotating shaft 18 due to the lower, bottom peripheral edges of the housing contacting and being resisted by the ground "G", macerating the roots of the weeds "W" and tilling the surrounding ground; and c) thereafter the cutting member 20 is manually moved up out of the ground "G", causing the housing 28 (128) to again move down about the cutting member 20 along the same parallel path toward the first position.

As a further, exemplary alternative, the garden implement of the present invention could be adapted and designed to be connected to a hand-held power source, such as, for example, a hand-held, electric drill by providing appropriate attachment means, which, like the embodiments of FIGS. 6 & 7, allows the cutting mechanism and its associated guard mechanism to be quickly and easily attached and detached from the driving shaft of the drill.

Figure 9A:
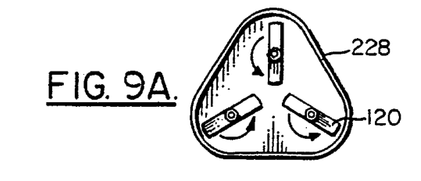
Figure 9B:
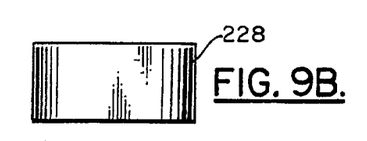
Figure 9C:
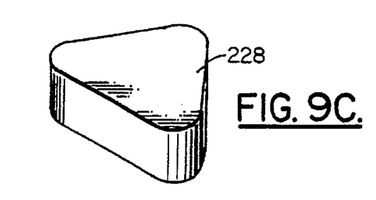

Likewise, the configuration of the retractable guard housing (28/128) and the number of the cutting blades (20) are subject to great variation, and exemplary variations are shown in FIGS. 9(A–C) through 12(A–C), with each set of figures providing bottom, side and perspective views, respectively. It is noted that these views are simplified and do not show the ancillary details for simplicity purposes but just the housing configurations and blades.

Figure 10A:
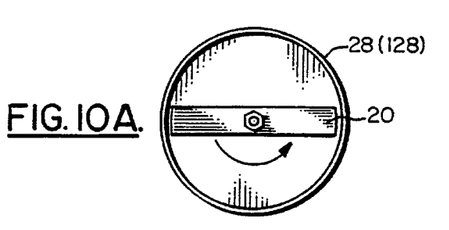
Figure 10B:
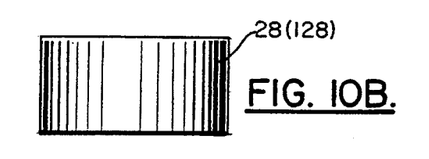
Figure 10C:
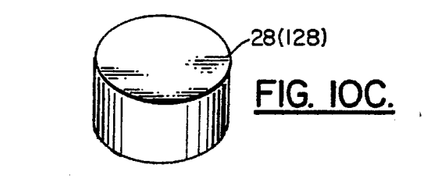
Figure 11A:
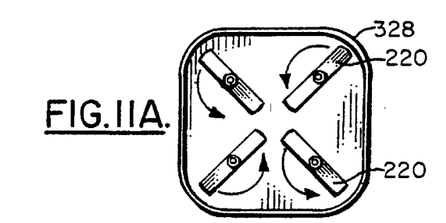
Figure 11B:
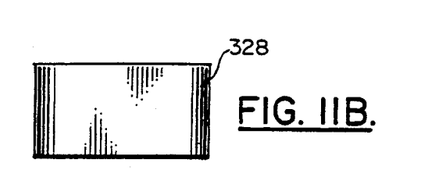
Figure 11C:
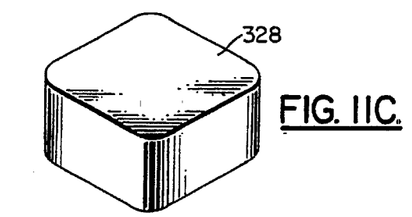
Figure 12A:
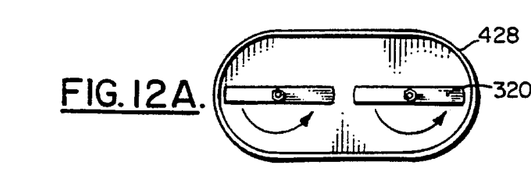
Figure 12B:
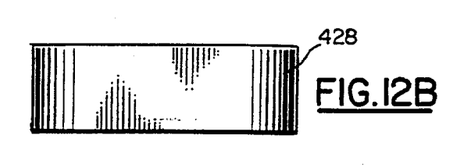
Figure 12C:
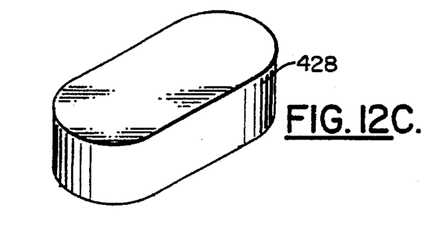

These figures show four (4), different, exemplary configurations for the cutting mechanism of the invention, namely:

a triangular configuration for the housing 228 working in combination with three (3) rotating blades 120 in FIGS. 9A–C;

a cylindrical configuration for the housing 28/128 working in combination with a single rotating blade 20 in FIGS. 10A–C, which is exemplary of the embodiments of FIGS. 1–8;

a rectangular configuration for the housing 328 working in combination with four (4) rotating blades 220 in FIGS. 11A–C; and an oval configuration for the housing 428 working in combination with two (2) rotating blades 320 in FIGS. 12A–C.

It should be understood that the foregoing variations and alternatives are merely exemplary and many other changes are possible within the teachings of the present invention.

Thus, it can be seen from the preceding description that garden cleaning implements which may be used to destroy and/or remove undesirable vegetation in close proximity to desirable vegetation by chopping or cutting the undesirable vegetation, both above and below the soil surface, and which has a rotating cutting/tilling member disposable within a vertically retractable housing, have been provided and fully described above in various exemplary embodiments.

However, it is noted that the embodiments of the garden cleaning implements described herein in detail for exemplary purposes is of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

I claim:

1. A garden cleaning implement for cutting and macerating weeds and the like, both above and below the ground line, comprising:

a hand carryable cutting mechanism, including a) a rotatable shaft operationally connectable to an associated source of rotational power; and b) a rotatable cutting member in functionally rigid attachment with said rotatable shaft, said rotatable cutting member having at least one functional cutting point rotatable within a plane capable of cutting weeds above the ground and macerating their roots within the ground; and an associated guard mechanism, including c) a moveable, retractable housing having a enclosing cavity of a size sufficient to receive therein said rotatable cutting member when said rotatable cutting member is rotating; and d) a guide, in operational connection between said retractable housing and said cutting mechanism and located above said cutting member, which guides the retraction of said retractable housing along a travel path extending above said cutting member between first and second positions, said first position being a position in which said rotatable cutting member is disposed within said enclosing cavity isolating it from adjacent vegetation, and said second position being a position in which said rotatable cutting member is below and outside of said enclosing cavity, allowing it to be relatively easily pushed down into the ground while rotatably being driven to macerate the roots of the weeds.

2. The garden cleaning implement of claim 1, wherein said guard mechanism further includes:

a top cavity plate, in mechanical connection with said cutting mechanism, having a surface with an aperture therethrough of a size sufficient to allow passage of said rotatable shaft, said top cavity plate being connected to said cutting mechanism in a manner such that a portion of said rotatable shaft between said source of rotational power and said rotatable cutting member is installed through said aperture, and said top cavity plate forms a partial barrier between said rotatable cutting member and said source of rotational power.

3. The garden cleaning implement of claim 2, wherein:

the effective volume of said cavity decreases as said retractable housing moves from said first position toward said second position.

4. The garden cleaning implement of claim 3, wherein:

a) a portion of said cavity defined by a side surface and a first and second open ends is cylindrically shaped;

b) said top cavity plate includes a circular shaped portion having a diameter less than the diameter of said first and second open ends; and c) said circular shaped portion of said top cavity plate is slidably disposed within said cylindrically shaped portion of said cavity.

5. The garden cleaning implement of claim 4, wherein said side surface includes:

at least two elongated apertures therethrough; and a like number of guide pins having two end portions, one end portion of each guide pin being in functionally rigid connection with said cutting mechanism and the other end portion of each guide pin being slidably disposed within one of said elongated apertures; said elongated apertures being oriented in a direction substantially perpendicular to the plane of rotation of said rotatable cutting member.

6. The garden cleaning implement of claim 4, wherein said guide means includes:

a) a support member having a support surface in rigid connection with said top cavity plate, said support surface having at least two elongated apertures therethrough; and b) a number of guide pins, corresponding to the number of said elongated apertures, having two end portions, one end portion of each guide pin being in functionally rigid connection with said retractable housing and the other end portion of each guide pin being slidably disposed within one of said elongated apertures; said elongated apertures being oriented in a direction substantially perpendicular to the plane of rotation of said rotatable cutting member.

7. The garden cleaning implement of claim 3, wherein:

said retractable housing is of a weight sufficient to move said retractable housing between said second and first positions.

8. The garden cleaning implement of claim 3, wherein said guard mechanism further includes:

biasing means for supplying a biasing force to said retractable housing in a direction to urge said retractable housing toward said first position.

9. The garden cleaning implement of claim 8, wherein said guide means includes:

a spring connected between one of said guide pins and said retractable housing.

10. The garden cleaning implement of claim 3, wherein said guard mechanism further includes:

a locking means, engageable by an operator, for selectably securing said retractable housing in a desired fixed position somewhere between and including said first and second positions.

11. The garden cleaning implement of claim 10, wherein:

a) a portion of said cavity defined by a side surface and a first and second open end is cylindrically shaped;

b) said top cavity plate includes a circular shaped portion having a diameter less than the diameter of said first and second open ends; and c) said circular shaped portion of said top cavity plate is slidably disposed within said cylindrically shaped portion of said cavity.

12. The garden cleaning implement of claim 11, wherein said side surface includes:

at least two elongated apertures therethrough; and a like number of guide pins having two end portions, one end portion of each guide pin being in functionally rigid connection with said cutting mechanism and the other end portion of each guide pin being slidably disposed within one of said elongated apertures; said elongated apertures being oriented in a direction substantially perpendicular to the plane of rotation of said rotatable cutting member.

13. The garden cleaning implement of claim 12, wherein one of said guide pins includes:

a threaded end section and said locking means comprises said threaded end section and a companionately threaded nut.

14. The garden cleaning implement of claim 11, wherein said guide means includes:

a) a support member having a support surface in rigid connection with said top cavity plate, said support surface having at least two elongated apertures therethrough; and b) a number of guide pins, corresponding to the number of said elongated apertures, having two end portions, one end portion of each guide pin being in functionally rigid connection with said retractable housing and the other end portion of each guide pin being slidably disposed within one of said elongated apertures; said elongated apertures being oriented in a direction substantially perpendicular to the plane of rotation of said rotatable cutting member.

15. The garden cleaning implement of claim 14, wherein:

one of said guide pins includes a threaded end section and said locking means comprises said threaded end section and a companionately threaded nut.

16. The garden cleaning implement of claim 1, wherein:

said source of rotational power is immediately adjacent to said retractable housing.

17. The garden cleaning implement of claim 1, wherein there is further provided an elongated pole handle having an operative, distal end and a user, proximal end; and wherein:

said source of rotational power is located at the user, proximal end of said pole handle.

18. The garden cleaning implement of claim 1, wherein there is further provided an elongated pole handle having an operative, distal end and a user, proximal end; and wherein there is further included:

attachment means for quickly and easily, alternatively affixing and detaching said cutter mechanism and said guard mechanism to and from the distal end of said pole handle.

19. The garden cleaning implement of claim 18, wherein said attachment means comprises:

a number of split, upwardly extending sections attached to said cutting mechanism, which sections define between them an open area which is varied in lateral size by the relative, separation positions of said sections with respect to one another and into which the distal end of said pole handle is placeable; and compressive means variably moving said sections together and apart to attach and detach said cutting mechanism to and from said handle.

20. The garden cleaning implement of claim 1, wherein:

said guide guides the retraction of said retractable housing along a travel path substantially parallel to the axis of rotation of said rotatable shaft extending above said cutting member between first and second positions.

21. A method of cutting and macerating weeds and the like, both above and below the ground line, comprising:

a) providing a hand carryable cutting mechanism, including
   i) a rotatable shaft operationally connectable to an associated source of rotational power; and
   ii) a rotatable cutting member in functionally rigid attachment with said rotatable shaft, said rotatable cutting member having at least one functional cutting point rotatable within a plane capable of cutting weeds above the ground and macerating their roots within the ground; and an associated guard mechanism, including
   iii) a moveable, retractable housing having a enclosing cavity of a size sufficient to receive therein said rotatable cutting member when said rotatable cutting member is rotating; and
   iv) a guide, in operational connection between said retractable housing and said cutting mechanism and located above said cutting member, for guiding the retraction of said retractable housing along a path extending above said cutting member between first and second positions, said first position being a position in which said rotatable cutting member is disposed within said enclosing cavity functionally isolating it from adjacent vegetation outside of said housing, and said second position being a position in which said rotatable cutting member is below and outside of said enclosing cavity, allowing it to be relatively easily pushed down into the ground while rotatably being driven to macerate the roots of the weeds;

b) manually moving said cutting mechanism around above the ground in a side ways and then up and down fashion, cutting the weeds above the ground as the weeds enter into said housing in said first position while using the housing to protect any surrounding vegetation outside of the housing;

c) manually pushing said cutting member down into the ground while said housing is inherently moved up to said second position above said cutting member along said path due to the lower, bottom peripheral edges of the housing contacting and being resisted by the ground, macerating the roots of the weeds and tilling the surrounding ground; and d) thereafter manually moving the cutting member up out of the ground, causing said housing to again move down about said cutting member along said path toward said first position.

22. The method of claim 21, wherein there is further provided in association with said cutting mechanism an elongated pole handle having an operative, distal end and a user, proximal end; and wherein there is further included in step "a" the steps of:

providing on said cutting mechanism attachment means; and quickly and easily, alternatively affixing and detaching said cutter mechanism and said guard mechanism to and from the distal end of said pole handle through the use of said attachment means.

* * * * *